(12) United States Patent
Berkeman et al.

(10) Patent No.: US 7,685,220 B2
(45) Date of Patent: Mar. 23, 2010

(54) CIRCULAR FAST FOURIER TRANSFORM

(75) Inventors: Anders Berkeman, Lund (SE); Leif Wilhelmsson, Dalby (SE); Jim Svensson, Ronneby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1106 days.

(21) Appl. No.: 11/302,243

(22) Filed: Dec. 14, 2005

(65) Prior Publication Data

US 2007/0133389 A1 Jun. 14, 2007

(51) Int. Cl.
*G06F 17/14* (2006.01)
(52) U.S. Cl. .................. 708/409; 708/404
(58) Field of Classification Search .......... 708/404, 708/409
See application file for complete search history.

(56) References Cited

U.S. PATENT DOCUMENTS

| | | | |
|---|---|---|---|
| 3,638,004 A | 1/1972 | Sloane et al. |
| 3,767,905 A | 10/1973 | Garde |
| 3,927,312 A | 12/1975 | Dickinson |
| 4,231,102 A | 10/1980 | Barr et al. |
| 4,563,750 A | 1/1986 | Clarke |
| 4,723,125 A | 2/1988 | Elleaume |
| 4,772,889 A | 9/1988 | Elleaume |
| 4,929,954 A | 5/1990 | Elleaume |
| 5,034,910 A | 7/1991 | Whelchel et al. |
| 5,327,367 A | 7/1994 | Yamada |
| 5,371,696 A | 12/1994 | Sundararajan et al. |
| 5,577,072 A | 11/1996 | Moon et al. |
| 5,717,620 A | 2/1998 | Williams |
| 6,370,188 B1 | 4/2002 | Wu et al. |
| 6,567,042 B2 | 5/2003 | Lin et al. |
| 6,633,616 B2 | 10/2003 | Crawford |

(Continued)

FOREIGN PATENT DOCUMENTS

EP 0827087 A 3/1998

(Continued)

OTHER PUBLICATIONS

PCT International Search Report, completed Apr. 15, 2008, in connection with International Application No. PCT/EP2006/011935.

(Continued)

*Primary Examiner*—Tan V Mai
(74) *Attorney, Agent, or Firm*—Potomac Patent Group PLLC

(57) ABSTRACT

A Decimation In Frequency (DIF) Fast Fourier Transform (FFT) stage is used in an N bin FFT, wherein N is an even integer. The DIF FFT stage includes swap logic that receives a first input sample, $x(v)$, and a second input sample, $x(v+N/2)$, and selectively supplies either the first and second input samples at respective first and second swap logic output ports or alternatively the second and first input samples at the respective first and second swap logic output ports, wherein $0 \leq v < N/2$. The DIF FFT stage further includes a summing unit for adding values supplied by the first and second swap logic output ports; a differencing unit for subtracting values supplied by the first and second swap logic output ports; and twiddle factor logic that multiplies a value supplied by the differencing unit by a twiddle factor, $W_N^{(v+s) mod(N/2)}$, where s is an integer representing an amount of circular shift of N input samples.

18 Claims, 5 Drawing Sheets

U.S. PATENT DOCUMENTS

| | | |
|---|---|---|
| 6,658,441 B1 | 12/2003 | Kim |
| 6,772,181 B1 | 8/2004 | Fu et al. |
| 2002/0159533 A1 | 10/2002 | Crawford |
| 2003/0026201 A1 | 2/2003 | Arnesen |
| 2003/0086508 A1 | 5/2003 | Magee |
| 2003/0182342 A1 | 9/2003 | Murphy |
| 2004/0064493 A1 | 4/2004 | Kulkarni et al. |
| 2005/0015420 A1 | 1/2005 | Gibb et al. |

FOREIGN PATENT DOCUMENTS

| | | |
|---|---|---|
| EP | 0880101 A | 11/1998 |

OTHER PUBLICATIONS

PCT Written Opinion, completed Apr. 15, 2008, in connection with International Application No. PCT/EP2006/011935.

Ramasubramanian, K. et al.: "An OFDM timing recovery scheme with inherent delay-spread estimation" Proceedings of The 2001 IEEE Global Telecommunications Conference, San Antonio, Texas, USA, Nov. 25-29, 2001, vol. 5, Nov. 25, 2001, pp. 3111-3115, XP010747382. ISBN: 0-7803-7206-9.

Writing Efficient Floating-Point FFTS for ADSP-TS201 TigerSHARC Processors, Engineer-to-Engineer Note EE-218, Rev 2—Mar. 4, 2004, Analog Devices, Inc.

Hu, Yu Hen: "CORDIC-Based VLSI Architectures for Digital Signal Processing" IEEE Signal Processing Magazine, Jul. 1992, pp. 16-35.

Li, Jin: "Reversible FFT and MDCT via Matrix Lifting" 2004 International Conference on Acoustics, Speech and Signal Processing, May 17-24, 2004 Montreal, Quebec, Canada.

Bahl, Sanat Kamal: "A Hardware Efficient Architecture for Fast Fourier Transform" in Proc. GSPx and ISPC, Mar. 31-Apr. 3, 2003, Dallas, Texas, USA.

He, Shousheng et al.: "A New Approach to Pipeline FFT Processor" in Proceedings of 10th International Parallel Processing Symposium, Apr. 15-19, 1996, Honolulu, Hawaii, USA.

Li, Jin: "Low Noise Reversible MDCT (RMDCT) and its Application in Progressive-to-lossless Embedded Audio Coding", IEEE Transactions on Signal Processing, May, 2005, vol. 53, Issue 5, pp. 1870-1880 ISSN: 1053-587X.

Bernard, E. et al.: "A Pipeline Architecture for Modified Higher Radix FFT", IEEE International Conference on Acoustics, Speech and Signal Processing, Mar. 23-26, 1992, vol. 5, pp. 617-620.

Withers, Langhorne P., Jr. et al: "Computing the Pipelined Phase-Rotation FFT", Jul. 13, 1993, CMU-CS-93-174.

PCT International Preliminary Report on Patentability, issued Jun. 18, 2008, in connection with International Application No. PCT/EP2006/011935.

CIRCULAR FAST FOURIER TRANSFORM

BACKGROUND

The present invention relates to the Fast Fourier Transform (FFT), and more particularly to accomplishing a FFT with a cyclic shift of the input data, or equivalently a FFT with a rotation of each output data.

The FFT has an enormous number of applications in modern digital signal processing, ranging from low-level telecommunication signaling to speech and image processing. In some applications, the transform data set is pre-shifted or post-rotated for specific purposes.

From transform theory, it is known that pre-shifting and post-rotation are equivalent operations. However, in conventional arrangements their implementations differ from one another. A pre-shifter is composed of a buffer at least the size of the transform size, and some addressing logic. By contrast, the post-rotator is implemented as a complex multiplier or as a pure rotator, using for example the COordinate Rotation DIgital Computer (CORDIC) algorithm, and some rotation angle generator (e.g., a table stored in a memory).

A typical application in which pre-shifting and/or post-rotation are used in conjunction with an FFT is in communication systems that utilize Orthogonal Frequency Division Multiplexing (OFDM) to communicate information. To date, OFDM is used in various wireless local area network (WLAN) standards (e.g., IEEE 802.11a and WiMAX) and digital television (DVB). OFDM is also being considered for future communication standards such as ultra wideband (UWB) and enhancements to the "3G" (third generation) cellular systems.

One use of the pre-shifting is in improving time synchronization in OFDM. A single time domain OFDM symbol with a cyclic prefix is illustrated in FIG. 1. At the transmitter, data is encoded into complex numbers, which are inverse Fourier transformed and appended with a cyclic prefix in the time domain. At the receiver side, data is recovered by applying the forward Fourier transform. Most, if not all, implementations rely on some FFT algorithm for the time-frequency transformations.

Receiver time synchronization, that is, finding the best location for placement of the FFT window, is crucial to achieve good receiver performance. Under no circumstances may the window be placed such that more than one symbol (including its cyclic prefix) is covered, since this would lead to inter-symbol interference (ISI), that is, the mixing of two independent symbols into one.

The optimal location of the window is to place it "as late as possible" without including data from the next symbol's cyclic prefix. An overly aggressive approach may, however, lead to ISI, so there has to be some margin of safety. Placing the window early, including parts of the cyclic prefix eliminates the risk of ISI, as long as the channel's impulse response is sufficiently short.

An early placement of the FFT window corresponds to a cyclic shift of the transform input data (see FIG. 1). The data chunk that was at the rightmost position in the transmitter now appears to the left in the receiver FFT window. For a system that uses frequency interpolation in the channel estimator, the larger the shift, the more complicated the interpolator. To keep the channel estimation simple, input data should be aligned in the FFT window by a pre-shift or post-rotation.

Another use for the pre-shifting and/or post-rotation in OFDM is when the communication channel has a large delay spread. Such channels experience a rotation in the frequency domain, which can be mitigated by the proposed FFT scheme.

The benefits of pre-shifting and/or post-rotation do not come without a price. A circular shift in the time domain requires a large buffer and a corresponding latency and energy consumption for a hardware implementation. The corresponding post-rotation requires a high precision de-rotator operating on all transform output data, resulting in an increase in chip area as well as energy consumption.

Existing solutions have presented problems. The state-of-the-art circular shift is implemented either in the time domain or the frequency domain. Although the two methods result in different realizations, what they have in common is that area, latency, and energy consumption increase to a significant amount compared to the FFT alone.

For a time domain solution, the input data to the FFT is shifted circularly before transformation. In order to perform this shift, all data to be transformed must be available if the FFT is not implemented using a pipelined approach. Thus an extra buffer of size N words is needed. Even if a pipelined approach is used for the FFT, it may be necessary to provide a buffer to store as many as N-1 words, depending on the amount of circular shifting that the arrangement is to be capable of handling.

In the frequency domain method, the shift corresponds to a rotation of each output data. No buffer is needed in this case, but the technique still has the associated problem of requiring a high resolution rotator. In addition, the output data from the FFT may be generated in a bit-reversed order, meaning that the rotation angle for each consecutive output sample will appear to be more or less random. Thus, a large table to store the angles may result.

In view of the preceding discussion, it is apparent that state-of-the-art methods suffer from a significant overhead in area, latency, and energy consumption. Therefore, it is desirable to provide improved techniques and apparatuses for accomplishing an FFT with a pre-shift/post-rotation of data.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in a Decimation In Frequency (DIF) FFT stage that is used in an N bin FFT, wherein N is an even integer. The DIF FFT stage includes swap logic that receives a first input sample, x(v), and a second input sample, x(v+N/2), and selectively supplies either the first and second input samples at respective first and second swap logic output ports or alternatively the second and first input samples at the respective first and second swap logic output ports, wherein $0 \leq v < N/2$. The DIF FFT stage further includes a summing unit for adding values supplied by the first and second swap logic output ports; a differencing unit for subtracting values supplied by the first and second swap logic output ports; and twiddle factor logic that multiplies a value supplied by the differencing unit by a twiddle factor, $W_N^{(v+s) \bmod (N/2)}$, where s is an integer representing an amount of circular shift of N input samples.

In another aspect, an FFT processor comprises the above-mentioned DIF FFT stage and logic that controls the swap logic by causing the first and second input samples to be supplied at the respective first and second swap logic output ports if (v+s)mod N<N/2, and causing the second and first input samples to be supplied at the respective first and second swap logic output ports if (v+s)mod N≧N/2.

In alternative embodiments, an FFT processor comprises the above-mentioned DIF FFT stage and logic that controls the swap logic by causing the first and second input samples to be supplied at the respective first and second swap logic output ports if (v+s)^N/2=0, and causing the second and first input samples to be supplied at the respective first and second swap logic output ports if (v+s)^N/2≠0, wherein ^ denotes a bitwise logical AND operation.

BRIEF DESCRIPTION OF THE DRAWINGS

The objects and advantages of the invention will be understood by reading the following detailed description in conjunction with the drawings in which.

DETAILED DESCRIPTION

Figure 1:
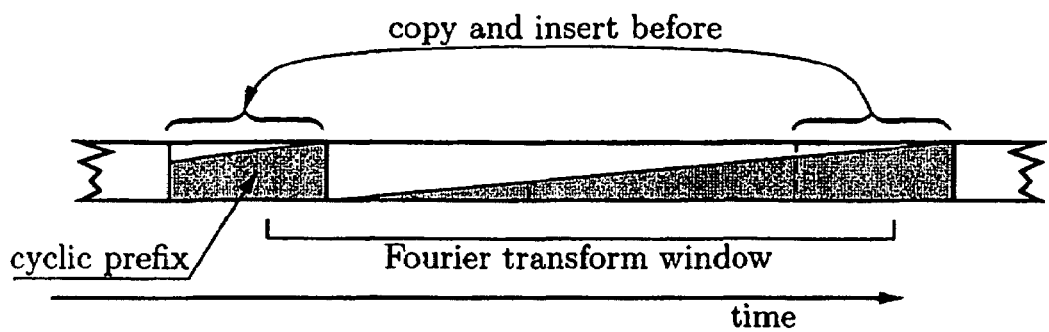
FIG. 1 is a single time domain OFDM symbol with a cyclic prefix.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of the invention is performance of the shifting/rotation and the FFT in the same operation, resulting in more efficient use of hardware, time, and energy. This approach, which is described in detail below, is applicable to all areas of technology in which shifted FFTs may be used, including but not limited to image processing, Wireless Local Area Networks (WLAN), ultra wideband (UWB) communications, echo cancellation, and the like. The approach is also applicable to all kind of FFT architectures, independent of pipelining, radix, or parallelization.

The radix-2 FFT algorithm is derived from the discrete Fourier transform by means of a divide and conquer approach. There are two fundamental versions of the algorithm, one derived by decimating in the time domain, and the other by decimation in the frequency domain. In order to facilitate an understanding of the various aspects of the invention, the discussion now begins with a derivation of the radix-2 Decimation In Frequency (DIF) FFT algorithm.

First, let x(n) be a sequence of samples for n=0 ... N−1, where N is an even number, and preferably a power of 2. The Discrete Fourier Transform (DFT) of the sequence x(n) is then denoted X(k), where k=0 ... N−1. Using the twiddle factor notation $$W_N = e^{-j2\pi/N}$$

to simplify the expressions, the DFT from x(n) to X(k) can be written $$DFT_N\{x(n)\} = X(k) = \sum_{n=0}^{N-1} x(n) W_N^{kn}. \quad (1)$$

Equation (1) is then analyzed independently for even and odd frequencies k. For even frequencies the expression is $$X(2k) = \sum_{n=0}^{N-1} x(n) W_N^{2kn} = \{W_N^{2k} = W_{N/2}^{kn}\} = \sum_{n=0}^{N-1} x(n) W_{N/2}^{kn}.$$

The twiddle factor of the sum completes twice the number of turns for n=0 ... N−1 compared to the original equation (1). Therefore, the sum is split into two half range sums, from 0 to N/2−1, $$X(2k) = \sum_{n=0}^{N/2-1} (x(n) + x(n+N/2)) W_{N/2}^{kn}.$$

This expression is easier to read by defining u(n)=x(n)+x(n+N/2) for 0≦n<N/2. In fact, it turns out to be the size N/2 FFT of u(n)

$$X(2k) = \sum_{n=0}^{N/2-1} u(n) W_{N/2}^{kn} = DFT_{N/2}\{u(n)\}.$$

Now, changing focus to the odd frequencies of the transform and applying the same technique gives $$X(2k+1) = \sum_{n=0}^{N-1} x(n) W_N^{(2k+1)n} = \sum_{n=0}^{N-1} x(n) W_N^{2kn} W_N^n = \sum_{n=0}^{N-1} (W_N^n x(n)) W_{N/2}^{kn}.$$

Here too, the twiddle factor makes twice the number of turns when n ranges from 0 to N−1 compared to Equation (1), and so similar to above, the sum is split into two half range sums, from 0 to N/2−1, $$X(2k+1) = \sum_{n=0}^{N/2-1} (W_N^n x(n) + W_N^{n+N/2} x(n+N/2)) W_{N/2}^{kn},$$

which equals $$X(2k+1) = \sum_{n=0}^{N/2-1} (W_N^n \{x(n) - x(n+N/2)\}) W_{N/2}^{kn}.$$

Introducing a new help variable $v(n)=W_N^n(x(n)-x(n+N/2))$ for n=0 to N/2−1 results in $$X(2k+1) = \sum_{n=0}^{N/2-1} v(n) W_{N/2}^{kn} = DFT_{N/2}\{v(n)\}.$$

To conclude, a size N FFT of the signal x(n) is divided into the computation of the two size N/2 FFTs of the sequences u(n) and v(n), where u and v are simple functions of x $$DFT_N\{x(n)\} \rightarrow DFT_{N/2}\{u(n)\} \text{ and } DFT_{N/2}\{v(n)\}, \text{ where}$$
$$u(n) = (x(n) + x(n+N/2)),$$
$$v(n) = W_N^n(x(n) - x(n+N/2)).$$

Figure 2:
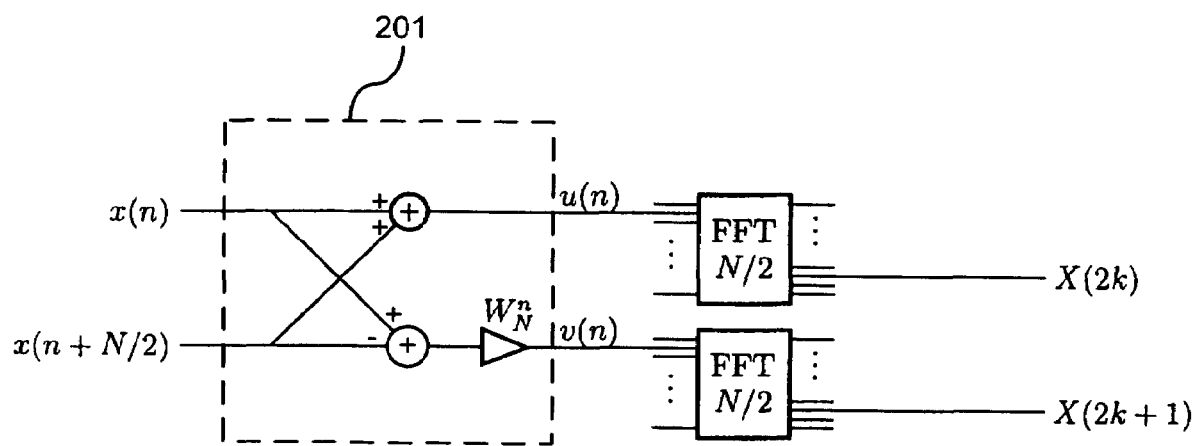
FIG. 2 is an arrangement for determining a size N Fourier transform from two size N/2 transforms.

An arrangement for determining a size N FFT from two size N/2 FFTs is illustrated in FIG. 2. The generation of u and v from x in the schematic is commonly denoted the "FFT butterfly" because of the shape of the add and subtract structure (enclosed within the dotted-line box 201) in the figure.

Figure 3:
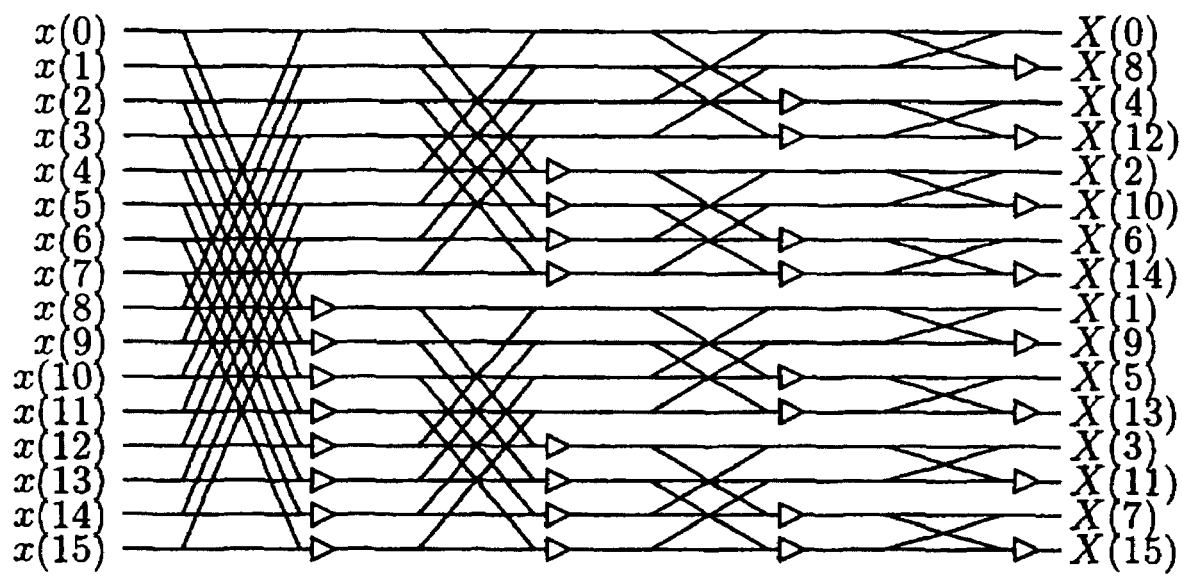
FIG. 3 is a schematic outline of an N=16 DIF FFT with four butterfly stages of eight butterflies each.

Application of the divide and conquer approach can be repeated as long as the transform to be divided up into two half-size transforms is even. Each repetition always results in a group of N/2 new butterflies. Such a group is denoted a butterfly stage. To illustrate this, FIG. 3 shows a schematic outline of an N=16 DIF FFT with four butterfly stages of eight butterflies each. Note how the outputs are generated in a bit-reversed order: Given the input order 0,1,2,3,...,13,14,15 (which, in binary notation is 0000, 0001, 0010, 0011, ..., 1101, 1110, 1111), the outputs appear in the order 0,8,4,12,...,11,7,15 (which in binary notation is 0000, 1000, 0100, 1100, ..., 1011, 0111, 1111).

It is further noted that, at each individual division of one transform into two half-size transforms, there is no need for N to be a power of two. However, if the size of the complete transform is not a power of two, then at some stage N will be even, but N/2 will not be, and then that transform cannot be further divided using the technique described above.

The effect of pre-shift and post-rotation will now be described. As before, the DFT of the time discrete signal x(n), n=0 ... N−1, is defined to be $$X(k) = \sum_{n=0}^{N-1} x(n) W_N^{kn},$$

where k=0 ... N−1. Let $x_s(n)$ be the signal x(n) shifted s cyclic steps to the left. Then, $$x_s(n)=x((n+s) \bmod N).$$

Now, the Fourier transform of $x_s(n)$ is by definition $$X_s(k) = \sum_{n=0}^{N-1} x_s(n) W_N^{kn}$$
$$= \sum_{n=0}^{N-1} x((n+s) \bmod N) W_N^{kn}$$
$$= \{l = n + s\}$$
$$= \sum_{l=s}^{N-1} x(l) W_N^{k(l-s)} + \sum_{l=0}^{s-1} x(l) W_N^{k(l-s)}$$
$$= \sum_{l=0}^{N-1} x(l) W_N^{k(l-s)}$$
$$= W_N^{-ks} \sum_{l=0}^{N-1} x(l) W_N^{kl}.$$

Substituting n=l gives $$X_s(k) = \sum_{n=0}^{N-1} x_s(n) W_N^{kn} = W_N^{-ks} \sum_{n=0}^{N-1} x(n) W_N^{kn}$$

which is the transform of x(n) multiplied by a rotation factor $W_N^{-ks}$. Thus, a shift in the time domain corresponds to a rotation in the frequency domain. For an inverse Fourier transform, the situation is the opposite.

A hardware implementation of an FFT may be based on a direct mapping of its data-flowgraph, such as the one depicted in FIG. 3. However, such a structure would require supporting hardware that is, in most cases, too fast because it requires all input data to be available in parallel for each transformation. Put another way, to utilize an FFT designed directly from a data-flowgraph, the data would have to arrive at a pace N times faster than the actual transformation speed. If the data rate were slower, the hardware would experience a significant idle time waiting for input, making the implementation unnecessarily chip area consuming.

For many digital signal processing applications, data arrives in a serial fashion, one sample after the other. This is the case, for example, for a digitized speech signal or a sampled radio baseband signal from an antenna. A parallel FFT implementation is clearly too fast for such applications. To avoid this mismatch, the data flowgraph may be folded in a manner that requires only one butterfly processor per butterfly stage to be implemented.

Figure 4A:
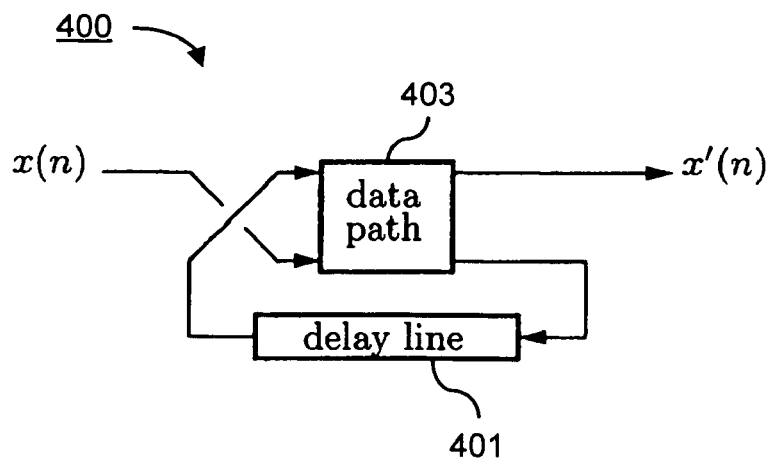
FIG. 4(a) illustrates an architecture for a radix-2 butterfly stage for a folded FFT implementation.
Figure 4B:
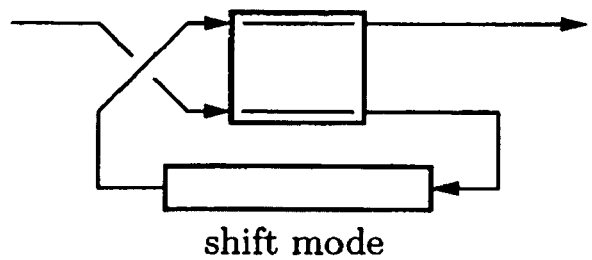
FIG. 4(b) illustrates the folded FFT implementation during a shift mode of operation.
Figure 4C:
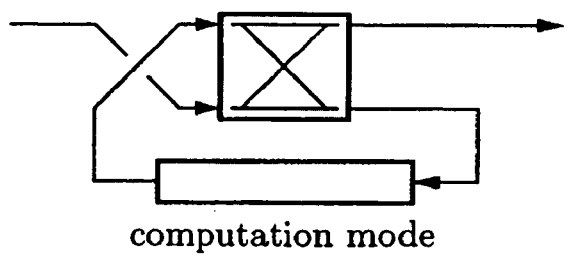
FIG. 4(c) illustrates the folded FFT implementation during a computation mode of operation.

The architecture for a radix-2 butterfly stage 400 for such a folded FFT implementation is depicted in FIG. 4(a). A size-N FFT is composed of $\log_2(N)$ such stages connected in series. The radix-2 butterfly stage 400 has a delay line 401 and selectable data path logic 403. The data path through the radix-2 butterfly stage 400 has two modes of operation: the shift mode (illustrated in FIG. 4(b)) and the computation mode (illustrated in FIG. 4(c)).

In the shift mode, the data path logic 403 is configured to receive N/2 samples from the input and feed these into the delay line 401. In parallel, data path logic 403 receives the contents of the delay line 401, and supplies this as the output of the radix-2 butterfly stage 400. Thus, the radix-2 butterfly stage 400 in this mode operates only as a delay line.

In the computation mode, the data path logic 403 computes a butterfly operation from a current input sample and a data shifted out from the delay line. One output from the butterfly operation is supplied as the output of the radix-2 butterfly stage 400, while the other output from the butterfly operation is fed to the input of the delay line 401.

In an aspect of the invention, a standard FFT processor is modified so that it computes the same result independent of the amount of circular shifting that is applied to the input data. The modification includes changing the butterfly processor element by adding an input data swapper and an offset to the twiddle factor index. Some simple control logic is included to determine what the twiddle factor offset should be and when the input data should be swapped. This is now described in greater detail.

Figure 5:
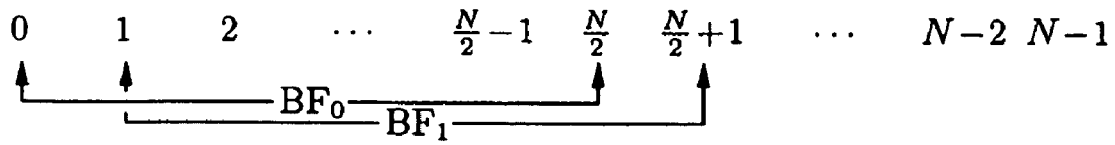
FIG. 5 schematically illustrates two butterfly operations in an arrangement comprising N/2 butterfly operations.

To facilitate an understanding of the various aspects of the invention, an exemplary single butterfly stage for an N bin FFT is analyzed. Consider the indices 0 ... N−1 for the N input samples $x(0)$ ... $x(N-1)$, and the corresponding N/2 butterflies needed to perform the FFT, of which butterflies 0 and 1 ("$BF_0$" and "$BF_1$") are schematically shown in FIG. 5. As is apparent from the derivation of the FFT algorithm, each butterfly $BF_i$ takes inputs that are spaced apart by N/2 input samples; that is, $BF_i$ has $x(i)$ and $x(i+N/2)$ as its inputs. Using this arrangement, the FFT algorithm can be computed in-place because the outputs for $BF_i$ can overwrite the variables $x(i)$ and $x(i+N/2)$.

Figure 6:
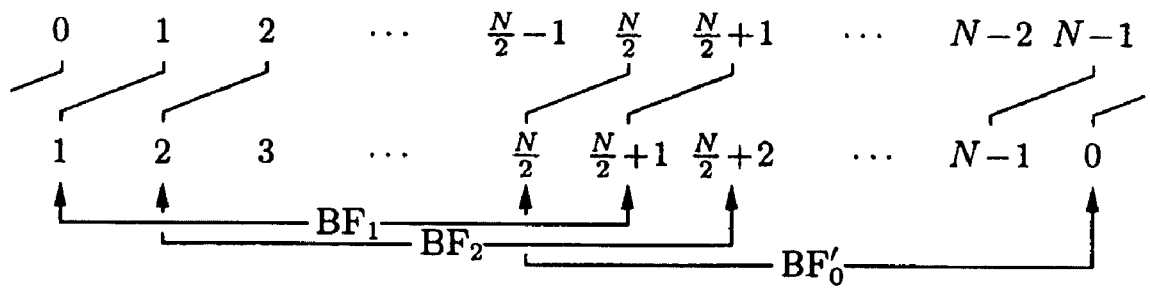
FIG. 6 schematically illustrates the affect on the butterfly operations of FIG. 5 after a circular left shift of the input data indices has been performed.

After a circular left shift of the input data indices, the situation is as depicted in FIG. 6. If it is desired that the FFT be computed as though the circular left shift had not taken place, then the butterfly operations have to be shifted too. For example, the leftmost butterfly, which previously received inputs corresponding to indices 0 and N/2, is now fed with inputs corresponding to index 1 and N/2+1. Consequently, instead of functioning as $BF_0$, this butterfly is changed to function as $BF_1$.

Similarly, the rightmost butterfly, which previously received inputs corresponding to indices N/2−1 and N−1, is now fed with inputs corresponding to indices N/2 and 0. Consequently, instead of functioning as $BF_{N/2-1}$, the functioning of this butterfly stage should be changed as well to match its inputs. It will be observed, however, that because the sample $x(0)$ has been wrapped from a left-most to a right-most position, the input order of the two samples $x(0)$ and $x(N/2)$ is reversed compared to a standard $BF_0$ butterfly. To indicate this reversal of inputs, the butterfly is denoted $BF_0'$.

Figure 7:
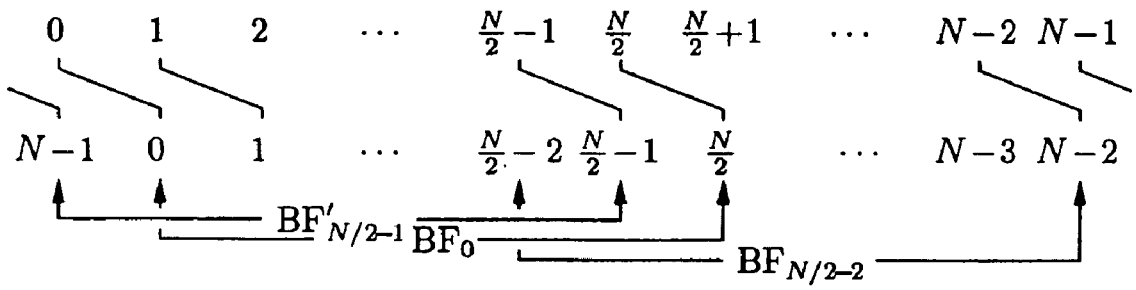
FIG. 7 schematically illustrates the affect on the butterfly operations of FIG. 5 after a circular right shift of the input data indices has been performed.

For a circular right shift of the input data, the situation is as depicted in FIG. 7. It can be seen that, because of the change in inputs, the left-most butterfly can be denoted $BF_{N/2-1}$, and its neighbor to the right becomes $BF_0$. The remaining butterflies change accordingly, with the right-most butterfly being $BF_{N/2-2}$.

Figure 8:
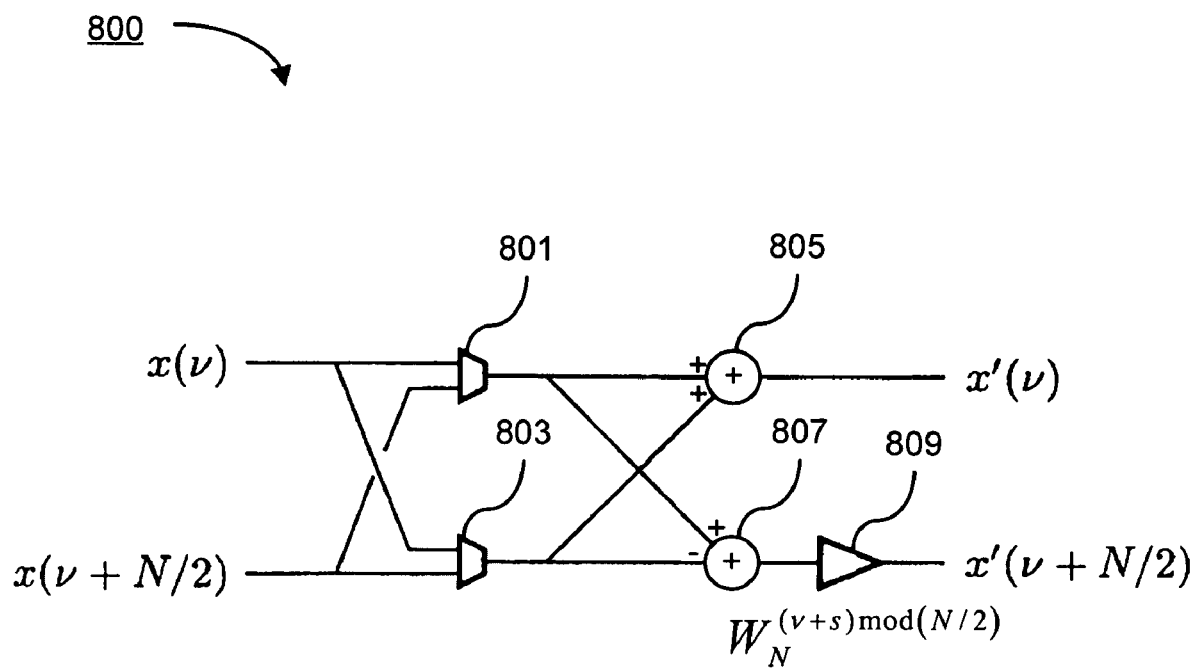
FIG. 8 is a schematic diagram of an exemplary radix-2 DIF FFT stage in accordance with aspects of the invention.

FIG. 8 is a schematic diagram of an exemplary radix-2 DIF FFT stage 800 (henceforth, "stage 800") in accordance with aspects of the invention. In order to accomplish the desired circular FFT function, the stage 800 differs from a conventional butterfly stage in several respects. First, the two inputs are supplied to respective ones of two multiplexers 801, 803. This enables the inputs to be conditionally swapped, depending on whether the butterfly stage is in a conventional $BF_x$ position (no swap necessary), or in a $BF_x'$ position (swap necessary to un-do the reversal of inputs).

Control logic (not shown) for the multiplexers 801, 803 may operate in accordance with the following: Given two inputs, $x(v)$ and $x(v+N/2)$, where $0 \leq v < N/2$, the multiplexers 801, 803 should swap the inputs if $(v+s) \bmod N \geq N/2$, or equivalently (when N is a power of 2) if $(v+s)\hat{}N/2 \neq 0$, where s is the number of shifts, and $\hat{}$ denotes the bitwise logical AND operation. Otherwise, swapping does not occur. The sign of s can be used to control the direction of shifting, but for convenience s can be limited to the range $0 \leq s < N$ because a shift of s bits in one direction (e.g., left) is equivalent to a shift of N−s bits in the opposite direction (e.g., right).

The output from the first multiplexer 801 is supplied to a first input of a summing unit 805 and also to a first input of a differencing unit 807. Similarly, the output from the last multiplexer 803 is supplied to a second input of the summing unit 805 and also to a second input of the differencing unit 807. The output from the second differencing unit 807 is supplied to twiddle factor logic 809.

Another aspect of the stage 800 that differs from a conventional butterfly stage is that the twiddle multiplication coefficient used within the twiddle factor logic 809 is offset by a factor s, so that it is equal to $W_N^{(v+s) \bmod (N/2)}$. The modulo operation comes at no cost if N is a power of two because it results in a wrap-around in a binary number system.

Two outputs are supplied by the stage 800: A first of these outputs, $x'(v)$, is supplied by the summing unit 805. The second of these outputs, $x'(v+N/2)$, is supplied by the twiddle factor logic 809.

A number of stages 800 may be interconnected in a manner such as illustrated in FIG. 3 to form a complete DIF FFT unit. Alternatively, a stage 800 may be incorporated into a design such as the one illustrated in FIG. 4(a) (for use as part of the data path logic 403) to create a pipelined radix-2 FFT architecture as described above.

The butterfly stage as exemplified by the stage 800 enables an FFT processor (herein referred to as "circular FFT processor") to be built that directly computes a transform of the pre-shifted, or equivalently post-rotated, data, without requiring separate pre-shift or post-rotation circuitry. The circular FFT processor is useful in many applications. Such applications include, but are not limited to: compensating for a misplaced FFT window in an OFDM receiver; and counteracting the rotation caused by channels having a large delay spread.

Designs in accordance with the invention provide a number of advantages over conventional techniques. For example, such designs do not suffer from the additional area, energy, and timing increments that result if a state-of-the-art pre-shift or post-rotation approach is applied to perform the same operation. Overall control of the processor is also simplified because the shifting is performed inside the FFT processor, and no additional blocks or wires have to be added, except for the input signal s that conveys the shift amount. For a system designer, the additional shifting functionality is hidden within the FFT hardware.

Circular FFTs in accordance with the invention are especially useful in situations in which the samples do not arrive at an FFT in a proper order $x(0), x(1), x(2), \ldots, x(N-1)$, but instead are circularly shifted by some amount, s, and so instead arrive in the order $x(s), x(s+1), x(s+2), \ldots, x(N-1)$, x(0), x(1), . . . , x(s−1). This can, for example, happen when there is an improperly placed FFT window in an OFDM receiver. Also, an undesired circular shift of input samples can be caused by propagation through a channel having a large delay spread. The circular FFT as taught here can be used to solve these problems because it enables the same FFT output to be generated as though there had not been any shift of the input samples. Conceptually, it is as if the FFT processor had circularly shifted the input by an amount, s, in the opposite direction before doing the calculations although, as has been shown, no actual shifting is needed to accomplish this. Such embodiments would include logic that determines an amount of circular shifting of the input samples and controls the FFT processor to use a value of s that is equivalent to the amount of circular shifting of the input samples but in an opposite direction.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A Decimation In Frequency (DIF) Fast Fourier Transform (FFT) stage for use in an N bin Fourier transform, wherein N is an integer, the DIF FFT stage comprising:
   swap logic that receives a first input sample, $x(v)$, and a second input sample, $x(v+N/2)$, and selectively supplies either the first and second input samples at respective first and second swap logic output ports or alternatively the second and first input samples at the respective first and second swap logic output ports, wherein $0 \leq v < N/2$;
   a summing unit for adding values supplied by the first and second swap logic output ports;
   a differencing unit for subtracting values supplied by the first and second swap logic output ports; and
   twiddle factor logic that multiplies a value supplied by the differencing unit by a twiddle factor, $W_N^{(v+s) mod(N/2)}$, where s is an integer representing an amount of circular shift of N input samples.

2. A Fast Fourier Transform (FFT) processor comprising:
   the DIF FFT stage of claim 1; and
   logic that controls the swap logic by causing the first and second input samples to be supplied at the respective first and second swap logic output ports if $(v+s) \mod N < N/2$, and causing the second and first input samples to be supplied at the respective first and second swap logic output ports if $(v+s) \mod N \geq N/2$.

3. An Orthogonal Frequency Division Multiplex (OFDM) receiver comprising:
   the FFT processor of claim 2; and
   logic that determines an amount of circular shifting of the input samples and controls the FFT processor to use a value of s that is equivalent to the amount of rotation of the input samples but in an opposite direction.

4. The OFDM receiver of claim 3, wherein the circular shifting of the input samples is caused by an improperly placed FFT window.

5. The OFDM receiver of claim 3, wherein the circular shifting of the input samples is caused by propagation of the input samples through a channel having a large delay spread.

6. A Fast Fourier Transform (FFT) processor comprising:
   the DIF FFT stage of claim 1; and
   logic that controls the swap logic by causing the first and second input samples to be supplied at the respective first and second swap logic output ports if $(v+s)\hat{\ }N/2=0$, and causing the second and first input samples to be supplied at the respective first and second swap logic output ports if $(v+s)\hat{\ }N/2 \neq 0$, wherein $\hat{\ }$ denotes a bitwise logical AND operation.

7. A method of performing a Decimation In Frequency (DIF) Fast Fourier Transform (FFT) for use in an N bin Fourier transform, wherein N is an even integer, the DIF FFT method comprising:
   using a radio receiver to receive a radio frequency signal and to generate therefrom a first input sample, $x(v)$, and a second input sample, $x(v+N/2)$, and selectively supplying either the first and second input samples at respective first and second swap logic output ports or alternatively the second and first input samples at the respective first and second swap logic output ports, wherein $0 \leq v < N/2$;
   adding values supplied by the first and second swap logic output ports;
   generating a difference value by subtracting values supplied by the first and second swap logic output ports; and
   multiplying the difference value by a twiddle factor, $W_N^{(v+s) mod(N/2)}$, where s is an integer representing an amount of circular shift of N input samples.

8. The method of claim 7, comprising:
   causing the first and second input samples to be supplied at the respective first and second swap logic output ports if $(v+s) \mod N < N/2$, and causing the second and first input samples to be supplied at the respective first and second swap logic output ports if $(v+s) \mod N \geq N/2$.

9. The method of claim 8, comprising:
   determining an amount of circular shifting of the input samples and setting s to a value that is equivalent to the amount of rotation of the input samples but in an opposite direction.

10. The method of claim 9, wherein the circular shifting of the input samples is caused by an improperly placed FFT window.

11. The method of claim 9, wherein the circular shifting of the input samples is caused by propagation of the input samples through a channel having a large delay spread.

12. The method of claim 7, comprising:
   causing the first and second input samples to be supplied at the respective first and second swap logic output ports if $(v+s)\hat{\ }N/2=0$, and causing the second and first input samples to be supplied at the respective first and second swap logic output ports if $(v+s)\hat{\ }N/2 \neq 0$, wherein $\hat{\ }$ denotes a bitwise logical AND operation.

13. A computer readable carrier having stored therein a set of one or more program instructions for causing one or more processors to perform a Decimation In Frequency (DIF) Fast Fourier Transform (FFT) method for use in an N bin Fourier transform, wherein N is an even integer, the DIF FFT method comprising:
   receiving a first input sample, $x(V)$, and a second input sample, $x(v+N/2)$, and selectively supplying either the first and second input samples at respective first and second swap logic output ports or alternatively the second and first input samples at the respective first and second swap logic output ports, wherein $0 \leq V < N/2$;
   adding values supplied by the first and second swap logic output ports;

generating a difference value by subtracting values supplied by the first and second swap logic output ports; and multiplying the difference value by a twiddle factor, $W_N^{(v+s)mod(N/2)}$, where s is an integer representing an amount of circular shift of N input samples.

14. The computer readable carrier of claim 13, comprising: causing the first and second input samples to be supplied at the respective first and second swap logic output ports if $(v+s) \mod N < /2$, and causing the second and first input samples to be supplied at the respective first and second swap logic output ports if $(v+s) \mod N \geq N/2$.

15. The computer readable carrier of claim 14, comprising: determining an amount of circular shifting of the input samples and setting s to a value that is equivalent to the amount of rotation of the input samples but in an opposite direction.

16. The computer readable carrier of claim 15, wherein the circular shifting of the input samples is caused by an improperly placed FFT window.

17. The computer readable carrier of claim 15, wherein the circular shifting of the input samples is caused by propagation of the input samples through a channel having a large delay spread.

18. The computer readable carrier of claim 13, comprising: causing the first and second input samples to be supplied at the respective first and second swap logic output ports if $(v+s)\hat{\ } N/2=0$, and causing the second and first input samples to be supplied at the respective first and second swap logic output ports if $(v+s)\hat{\ } N/2 \neq 0$, wherein $\hat{\ }$ denotes a bitwise logical AND operation.

* * * * *

UNITED STATES PATENT AND TRADEMARK OFFICE
CERTIFICATE OF CORRECTION

PATENT NO. : 7,685,220 B2  
APPLICATION NO. : 11/302243  
DATED : March 23, 2010  
INVENTOR(S) : Berkeman et al.

Page 1 of 1

It is certified that error appears in the above-identified patent and that said Letters Patent is hereby corrected as shown below:

In Column 1, Line 10, delete "modem" and insert -- modern --, therefor.

In Column 10, Line 60, in Claim 13, delete "x(V),and" and insert -- x(v), and --, therefor.

In Column 10, Line 65, in Claim 13, delete "$0 \leqq V<N/2;$" and insert -- $0 \leq v<N/2;$ --, therefor.

In Column 11, Line 4, in Claim 13, delete "$W_N^{(v+s)mod(N/}2),$" and insert -- $W_N^{(v+s)mod(N/2)}$, --, therefor.

In Column 11, Line 9, in Claim 14, delete "N</2," and insert -- N<N/2, --, therefor.

Signed and Sealed this

Second Day of November, 2010

David J. Kappos  
*Director of the United States Patent and Trademark Office*